(12) United States Patent
Cao et al.

(10) Patent No.: US 9,672,814 B2
(45) Date of Patent: *Jun. 6, 2017

(54) SEMI-SUPERVISED LEARNING OF WORD EMBEDDINGS

(71) Applicant: International Business Machines Corporation, Armonk, NY (US)

(72) Inventors: Liangliang Cao, Amherst, MA (US); James J. Fan, Mountain Lakes, NJ (US); Chang Wang, White Plains, NY (US); Bing Xiang, Mount Kisco, NY (US); Bowen Zhou, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/707,720

(22) Filed: May 8, 2015

(65) Prior Publication Data

US 2016/0329044 A1 Nov. 10, 2016

(51) Int. Cl.
G06F 17/27 (2006.01)
G06F 17/21 (2006.01)
(Continued)

(52) U.S. Cl.
CPC ............ *G10L 15/063* (2013.01); *G06F 17/28* (2013.01); *G06F 17/3069* (2013.01); *G06N 3/04* (2013.01);
(Continued)

(58) Field of Classification Search
None
See application file for complete search history.

(56) References Cited

U.S. PATENT DOCUMENTS 7,752,046 B2 * 7/2010 Bacchiani ............ G06K 9/6226
704/245
7,949,186 B2 * 5/2011 Grauman ............. G06K 9/4671
382/159
(Continued)

FOREIGN PATENT DOCUMENTS

CN 103995805 A 6/2014

OTHER PUBLICATIONS

U.S. Appl. No. 14/870,204, Entitled "Semi-Supervised Learning of Word Embeddings", filed Sep. 30, 2015.
(Continued)

*Primary Examiner* — Satwant Singh
(74) *Attorney, Agent, or Firm* — William H. Hartwell

(57) ABSTRACT

Software that trains an artificial neural network for generating vector representations for natural language text, by performing the following steps: (i) receiving, by one or more processors, a set of natural language text; (ii) generating, by one or more processors, a set of first metadata for the set of natural language text, where the first metadata is generated using supervised learning method(s); (iii) generating, by one or more processors, a set of second metadata for the set of natural language text, where the second metadata is generated using unsupervised learning method(s); and (iv) training, by one or more processors, an artificial neural network adapted to generate vector representations for natural language text, where the training is based, at least in part, on the received natural language text, the generated set of first metadata, and the generated set of second metadata.

14 Claims, 4 Drawing Sheets

(51) Int. Cl.
| | |
|---|---|
| G10L 15/00 | (2013.01) |
| G10L 15/16 | (2006.01) |
| G10L 15/06 | (2013.01) |
| G10L 15/18 | (2013.01) |
| G06F 17/28 | (2006.01) |
| G06N 3/04 | (2006.01) |
| G06N 99/00 | (2010.01) |
| G06F 17/30 | (2006.01) |

(52) U.S. Cl.
CPC ............ G06N 99/005 (2013.01); G10L 15/16 (2013.01); G10L 15/18 (2013.01)

(56) References Cited

U.S. PATENT DOCUMENTS

| | | | | |
|---|---|---|---|---|
| 7,996,224 | B2* | 8/2011 | Bacchiani | G10L 15/193 704/254 |
| 8,069,043 | B2* | 11/2011 | Bacchiani | G06K 9/6226 704/245 |
| 8,352,245 | B1* | 1/2013 | Lloyd | G10L 15/183 704/9 |
| 8,352,246 | B1* | 1/2013 | Lloyd | G10L 15/183 704/9 |
| 8,560,477 | B1* | 10/2013 | Petrov | G06N 99/005 706/46 |
| 8,630,860 | B1* | 1/2014 | Zhang | G06F 17/30026 704/235 |
| 8,831,957 | B2* | 9/2014 | Taubman | H04M 1/72572 379/88.01 |
| 8,874,432 | B2* | 10/2014 | Qi | G06F 17/271 704/9 |
| 8,892,446 | B2* | 11/2014 | Cheyer | G06F 17/3087 704/246 |
| 8,903,716 | B2* | 12/2014 | Chen | G06F 17/3087 704/10 |
| 8,930,191 | B2* | 1/2015 | Gruber | G06F 17/3087 704/246 |
| 8,942,986 | B2* | 1/2015 | Cheyer | G06F 17/3087 704/231 |
| 9,076,445 | B1* | 7/2015 | Lloyd | G10L 15/183 |
| 9,099,092 | B2* | 8/2015 | Zhang | G06F 17/30026 |
| 9,117,447 | B2* | 8/2015 | Gruber | G06F 17/3087 |
| 9,318,108 | B2* | 4/2016 | Gruber | G10L 15/1815 |
| 9,324,323 | B1* | 4/2016 | Bikel | G10L 15/197 |
| 9,338,493 | B2* | 5/2016 | Van Os | G10L 15/22 |
| 2002/0066097 | A1 | 5/2002 | Hattori et al. | |
| 2004/0117365 | A1 | 6/2004 | Schlageter et al. | |
| 2012/0045002 | A1 | 2/2012 | Zivkovic | |
| 2013/0197918 | A1 | 8/2013 | Ansell | |
| 2014/0156567 | A1* | 6/2014 | Scholtes | G06F 17/30 706/12 |
| 2014/0219563 | A1* | 8/2014 | Rodriguez-Serrano | G06K 9/18 382/182 |
| 2015/0294669 | A1* | 10/2015 | Zhang | G06F 17/30026 704/235 |

OTHER PUBLICATIONS

Appendix P.: List of IBM Patents or Patent Applications Treated as Related, Dated Sep. 30, 2015, 2 pages.
Collobert, R. et al. "A Unified Architecture for Natural Language Processing: Deep Neural Networks with Multitask Learning". pp. 160-167. Proceedings of the 25th International Conference on Machine Learning, Helsinki, Finland, 2008.
Hu et al.; "Convolutional Neural Network Architectures for Matching Natural Language Sentences"; Hangli-hl; In Proceedings of Advances in Neural Information Processing Systems 27 (NIPS); 2014; [online] <http://www.hangli-hl.com/uploads/3/1/6/8/3168008/hu-etal-nips2014.pdf>.
Huang et al.; "Improving Word Representations via Global Context and Multiple Word Prototypes"; Stanford; In Proceedings of the Association for Computational Linguistics 2012 Conference (ACL '12); [online] <http://nlp.stanford.edu/pubs/HuangACL12.pdf>.
Lee et al.; "Pseudo-Label : The Simple and Efficient Semi-Supervised Learning Method for Deep Neural Networks"; ICML 2013 Workshop: Challenges in Representation Learning (WREPL); Atlanta, Georgia, USA; Copyright 2013 by the author(s); [online] <http://deeplearning.net/wp-content/uploads/2013/03/pseudo_label_final.pdf>.
Luong et al.; "Better Word Representations with Recursive Neural Networks for Morphology"; [online] <http://nlp.stanford.edu/~lmthang/data/papers/conll13_morpho.pdf>.
Rajkumar et al.; "Paraphrase Recognition using Neural Network Classification"; © 2010 International Journal of Computer Applications (0975-8887); vol. 1—No. 29; pp. 42-47; [online] <http://citeseerx.ist.psu.edu/viewdoc/summary?doi=10.1.1.206.4557>.
Shinyama et al.; "Paraphrase Acquisition for Information Extraction"; Proceedings of the second international workshop on Paraphrasing; vol. 16; pp. 65-71.
Weston et al.; Deep Learning via Semi-Supervised Embedding; Proceedings of the 25th International Conference on Machine Learning; Helsinki, Finland; Copyright 2008 by the author(s)/owner(s); [online] <http://www.thespermwhale.com/jaseweston/papers/deep_embed.pdf>.
Zeng et al.; "Relation Classification via Convolutional Deep Neural Network"; License under a Creative Commons Attribution 4.0 International License; [online] <http://www.nlpr.ia.ac.cn/cip/liukang.files/coling2014.pdf>.
Bengio, Y. et al. "A Neural Probabilistic Language Model". Journal of Machine Learning Research 3 (2003) pp. 1137-1155. Copyright 2003 Bengio et al.
Mikolov, T. et al. "Efficient Estimation of Word Representation in Vector Space". arXiv: 1301.3781v1 [cs.CL] Jan. 16, 2013.
Mikolov, T. et al. "Efficient Estimation of Word Representation in Vector Space". arXiv: 1301.3781v3 [cs.CL] Sep. 7, 2013.
Weston, J. et al. "Deep Learning via Semi-supervised Embedding". G. Montavon et al. (Eds.) NN: Tricks of the Trade, 2nd edn., LNCS 7700, pp. 639-655, 2012. Copyright Springer-Verlag Berlin Heidelberg.
U.S. Appl. No. 14/707,720, filed May 8, 2015.

* cited by examiner

US 9,672,814 B2

SEMI-SUPERVISED LEARNING OF WORD EMBEDDINGS

BACKGROUND

The present invention relates generally to the field of natural language processing, and more particularly to learning word embeddings for determining similarity between words and phrases.

Natural language processing (NLP) is a field of computer science, artificial intelligence, and linguistics that, amongst other things, is concerned with using computers to derive meaning from natural language text. NLP systems may perform many different tasks, including, but not limited to, determining the similarity between certain words and/or phrases. One known way to determine the similarity between words and/or phrases is to compare their respective word embeddings. Generally speaking, a word embedding is a mapping of natural language text to a vector of real numbers in a low dimensional space (and is also sometimes referred to as a "vector representation").

SUMMARY

According to an aspect of the present invention, there is a method, computer program product and/or system that performs the following steps (not necessarily in the following order): (i) receiving, by one or more processors, a set of natural language text; (ii) generating, by one or more processors, a set of first metadata for the set of natural language text, where the first metadata is generated using supervised learning method(s); (iii) generating, by one or more processors, a set of second metadata for the set of natural language text, where the second metadata is generated using unsupervised learning method(s); and (iv) training, by one or more processors, an artificial neural network adapted to generate vector representations for natural language text, where the training is based, at least in part, on the received natural language text, the generated set of first metadata, and the generated set of second metadata.

DETAILED DESCRIPTION

Figure 1:
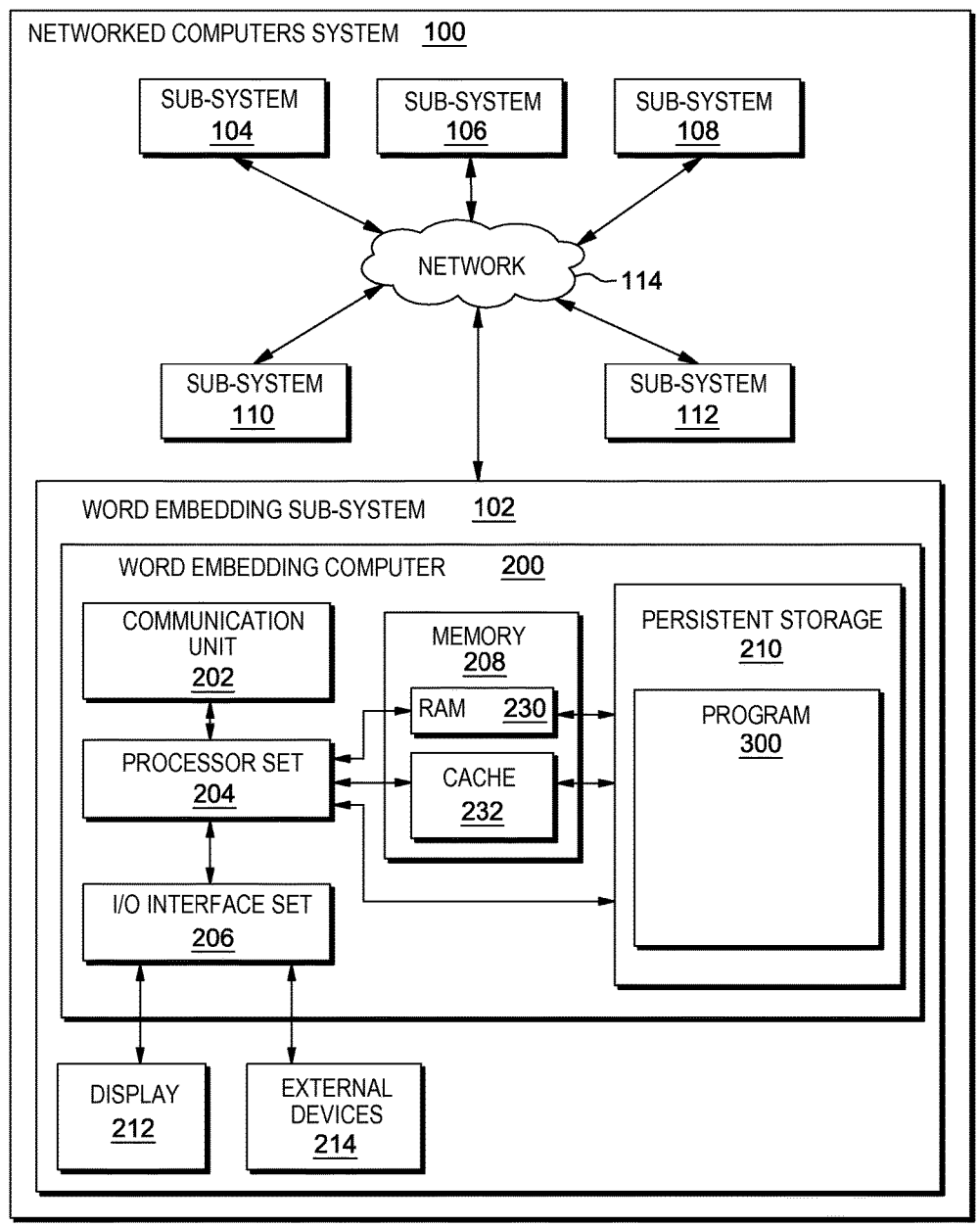
FIG. 1 is a block diagram view of a first embodiment of a system according to the present invention.

In natural language processing (NLP), it can be helpful to represent natural language text as vectors in order to determine similarity by comparing vector representations. However, representing words and phrases as vectors (also referred to as "word embedding") can be a difficult task, with each known method having its own drawbacks. Embodiments of the present invention generate vector representations for natural language text using an artificial neural network, training the artificial neural network using both supervised and unsupervised learning methods. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: word embedding sub-system 102; word-embedding sub-systems 104, 106, 108, 110, 112; communication network 114; word embedding computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention (including, for example, sub-systems 104, 106, 108, 110 and 112). Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with word embedding computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
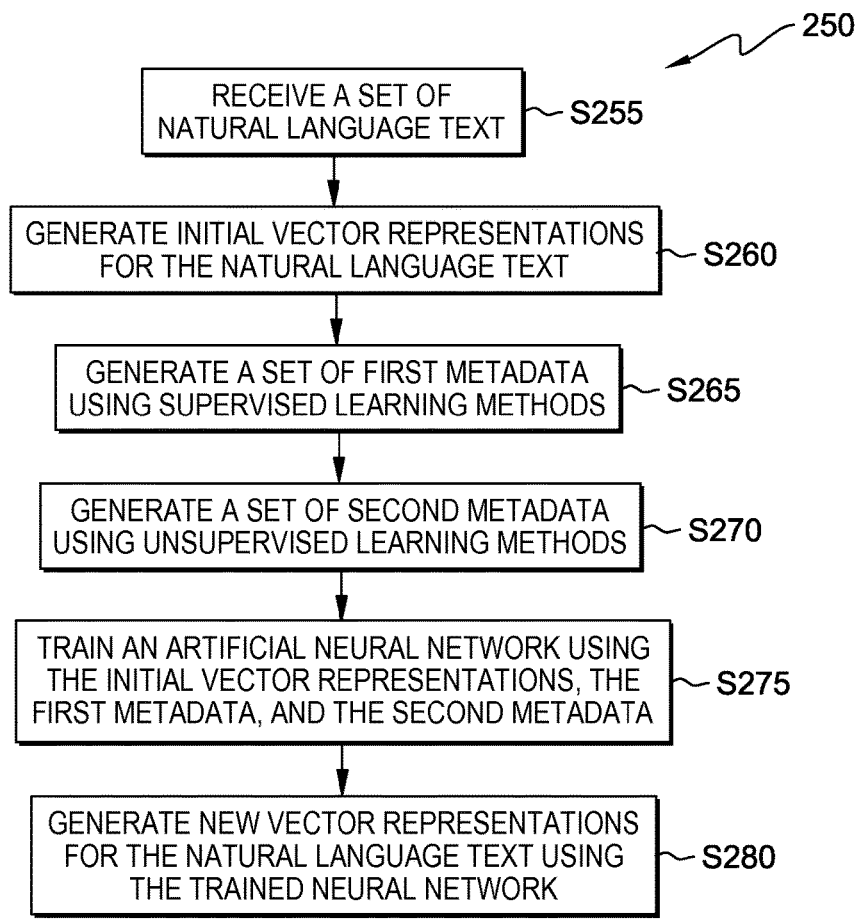
FIG. 2 is a flowchart showing a first embodiment method performed, at least in part, by the first embodiment system.
Figure 3:
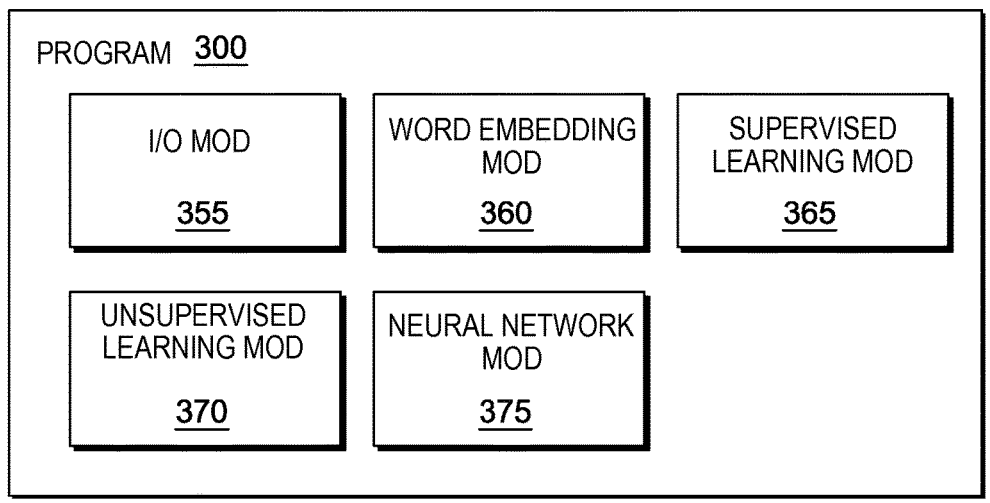
FIG. 3 is a block diagram showing a machine logic (for example, software) portion of the first embodiment system.

FIG. 2 shows flowchart 250 depicting a method (sometimes referred to as method 250) according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks). It should be noted that the current example embodiment (also referred to in this sub-section as the "present embodiment," the "present example," the "present example embodiment," and the like) is used herein for example purposes, in order to help depict the scope of the present invention. As such, other embodiments (such as embodiments discussed in the Further Comments and/or Embodiments sub-section, below) may be configured in different ways or refer to other features, advantages, and/or characteristics not fully discussed in this sub-section. Furthermore, although program 300 is depicted as residing in persistent storage 210 on word embedding computer 200 of word embedding sub-system 102 (see FIG. 1), it should be understood that in other embodiments, all or part of program 300 may reside in word-embedding sub-systems 104, 106, 108, 110, 112, or elsewhere.

One way to determine similarity between words and/or phrases in a natural language processing (NLP) system is to compare vector representations of those words and/or phrases. As stated above, embodiments of the present invention (including the present example embodiment) generate vector representations using an artificial neural network. Method 250 is a method for training a neural network and using it to generate vector representations according to these embodiments.

Processing begins at step S255, where input/output (I/O) module ("mod") 355 receives a set of natural language text. The received set of natural language text is the text for which method 250 will generate vector representations (or "word embeddings") using an artificial neural network. Generally speaking, the set of natural language text may include any natural language text that is capable of being represented by a vector. In some embodiments, the set of natural language text includes a single word or phrase. In other embodiments, the set of natural language includes an entire document (such as an article or a book). In still other embodiments, the set of natural language text includes a large collection of documents and/or other textual content, including, but not limited to, the entire collection of data available via the World Wide Web. In the present example embodiment, which will be discussed throughout this sub-section, the set of natural language text is a single sentence of text: "In 1914, Thomas Watson was hired as general manager of the Computing-Tabulating-Recording Company."

Processing proceeds to step S260, where word embedding mod 360 generates initial vector representations (that is, word embeddings) for the set of natural language text. In some embodiments, particularly embodiments in which an artificial neural network has not yet been generated and/or trained, the initial vector representations are randomly generated by word embedding mod 360. In other embodiments (such as embodiments where an artificial neural network has been initially trained or is in the process of being trained), an artificial neural network (such as one created by neural network mod 375, discussed below) is used to generate the initial vector representations. It should be noted, however, that the purpose of this step is not to generate vector representations that will immediately be used to compare words and/or phrases. Rather, step S260 generates initial vector representations that will be used to train an artificial neural network, where the artificial neural network will ultimately be used to generate new vector representations.

In the present example embodiment, each word of the set of natural language text is initialized as a randomly generated 100-dimension vector (some examples of which will be discussed later in this sub-section). Further, for each set of three words in the set of natural language text, a 100-dimension vector corresponding to the sum of each of the three 100-dimension word vectors is generated. For example, for the three word phrase "Watson was hired," a 100-dimension vector is generated by adding the randomly generated 100-dimension vectors for "Watson", "was", and "hired", respectively.

Processing proceeds to step S265, where supervised learning mod 365 generates a set of first metadata (also sometimes referred to as "actual labels") for the set of natural language text using supervised learning methods. The supervised learning methods may include any method for obtaining metadata using known information about the natural language text. For example, in some embodiments, the supervised learning methods include using ontologies to apply known, pre-determined, metadata to the natural language text. In other (or the same) embodiments, the supervised learning methods include using one or more natural language annotators to generate first metadata for the natural language text. The natural language annotators may be computer modules adapted to annotate text without human intervention, or the annotators may include a human component where one or more human beings add metadata to the natural language text (or verify metadata added to the natural language text). For additional discussion and examples of first metadata (that is, "actual labels") and supervised learning methods, including a discussion of "fully supervised" methods and "distantly supervised methods," see: (i) the Further Comments and/or Embodiments sub-section of this Detailed Description; and (ii) the Definitions sub-section of this Detailed Description.

In the present example embodiment, the set of first metadata includes metadata for a number of words and phrases included in the natural language text. Specifically, supervised learning mod 365 generates the following first metadata in step S265: (i) for "1914", the generated first metadata is "[Number, Year]"; (ii) for "Thomas Watson", the generated first metadata is "[Person]"; (iii) for "general manager", the generated first metadata is "[Person]"; and (iv) for "Computing-Tabulating-Recording Company", the generated first metadata is "[Company]".

Processing proceeds to step S270, where unsupervised learning mod 370 generates a set of second metadata (also sometimes referred to as "pseudo labels") for the set of natural language text using unsupervised learning methods. The unsupervised learning methods may include any method for obtaining metadata that does not use known metadata pertaining to the natural language text. For example, in some embodiments, the unsupervised learning methods utilize language models to generate the set of second metadata for the set of natural language text. In other (or the same) embodiments, the unsupervised learning methods may utilize known (or yet to be known) data mining methods for generating the set of second metadata for the natural language text. Furthermore, as used herein, the unsupervised learning methods may also include known (or yet to be known) reinforcement learning methods. For additional discussion and examples of second metadata (that is, "pseudo labels") and unsupervised learning methods, see: (i) the Further Comments and/or Embodiments sub-section of this Detailed Description; and (ii) the Definitions sub-section of this Detailed Description.

In the present example embodiment, the set of second metadata includes metadata for certain words and phrases included in the set of natural language text. For each word (except the final word in the set), the second metadata is the subsequent word in the set of natural language text. Similarly, for each three-word phrase, the second metadata is the subsequent three-word phrase in the set of natural language text. For example, the second metadata for the word "Thomas" is "Watson", and the second metadata for "Watson was hired" is "as general manager."

Processing proceeds to step S275, where neural network mod 375 trains an artificial neural network based, at least in part, on the initial vector representations, the first metadata, and the second metadata, where the artificial neural network is adapted to generate vector representations for natural language text. In certain embodiments, the training of step S275 involves converting the first metadata and the second metadata into vector representations of their own, so that the artificial neural network may use their vector representations to improve its own ability to generate vector representations for natural language text. For example, in some embodiments (include embodiments discussed below in relation to FIG. 5), the vector representations for the first metadata (or "actual labels") and second metadata (or "pseudo labels") are used in an output layer of an artificial neural network. In some of these embodiments, training (or "learning") techniques such as backpropagation use the output layer to train the artificial neural network in the direction opposite that of normal movement/propagation through the artificial neural network. For example, in a feed-forward artificial neural network, the training may occur in the backwards direction.

In many embodiments, the training in step S275 involves applying weights to the first metadata and the second metadata (and, in many cases, their respective vector representations). For example, in some embodiments, the first metadata (or "actual labels") are weighted more heavily than the second metadata (or "pseudo labels"). In fact, in some embodiments, the second metadata is only used when there is no first metadata available for a particular portion of the natural language text (giving the second metadata an effective weight of zero, and giving the first metadata an effective weight of one). In still other embodiments, the weights are learned over time, where the weights are originally initialized randomly and are improved through multiple iterations of training the artificial neural network. It should be noted, however, this is not meant to be limiting, and many known (or yet to be known) weighting techniques and/or methods may be used in this step.

In the present example embodiment, the artificial neural network is trained using the following: (i) the 100-dimension vectors generated in step S260; (ii) the first metadata generated in step S265; and (iii) the second metadata generated in step S270. Furthermore, before training occurs, the first metadata and the second metadata are converted to vector representations using word embedding mod 360.

Processing proceeds to step S280, where neural network mod 375 generates new vector representations for the received natural language text using the trained neural network. In certain embodiments, the newly generated vector representations are then used to compare two pieces of natural language text in a vector space. For example, in many embodiments, vectors representing words and/or phrases are compared using a cosine function. In other embodiments (specifically, in embodiments where the initial natural language text was used for training purposes), new natural language text is provided in step S280, such that the benefits of the training of step S275 can be used to generate vector representations for new, previously unused, text.

In the present example embodiment, vector representations are generated for each word and phrase included in the set of natural language text. Examples of four of these vector representations are shown below:

New 100-Dimension Vector Representations
1914 0.070971 −0.323424 −0.054982 0.077030 0.258780
−0.331298  0.044022  0.142605 −0.336960 −0.065916
0.032561 −0.246940 −0.023940  0.191190 −0.011038
−0.232583 −0.064388  0.057610  0.195978 −0.133473
−0.262151  0.197413 −0.079998  0.071520 −0.099481
−0.166341  0.206930 −0.272377  0.087490  0.194562
−0.042512 −0.276855 −0.246291 −0.124469  0.096583
0.232440  0.071173  0.087750 −0.006826 −0.130006
0.211889  0.075612  0.184794 −0.132459 −0.022868
0.083495  0.295098  0.135592 −0.614848  0.012288
−0.029977 −0.086099  0.106493 −0.168172  0.197756
−0.063467  0.268130 −0.106223  0.245733  0.304453
0.002384  0.160324  0.139279  0.019387 −0.119221
0.355256 −0.097031  0.166341  0.101860 −0.084986
0.050472 −0.149975  0.031529 −0.169528 −0.146352
−0.110584  0.238571  0.083068  0.035048  0.022807
−0.160903  0.290476 −0.068321  0.032687  0.062524
−0.212844 −0.127900 −0.295905 −0.164292 −0.162962
0.065076 −0.064928  0.284807  0.099984 −0.095414
0.007225 0.112942 0.189210 −0.368570 0.192432
Thomas Watson 0.311558 −0.198773 −0.169359 −0.094617
0.226114  0.137245  0.087028 −0.194002  0.051605
−0.108622  0.084739  0.030995  0.124009  0.157173
0.043668  0.046474 −0.403117 −0.242037 −0.103499
−0.048212  0.288942 −0.011930 −0.503946  0.012780
0.251367 −0.181198  0.207259 −0.112637  0.232909
−0.080983  0.266087  0.094756 −0.035746 −0.059142
0.101169 −0.021112  0.170907 −0.343151  0.145854
0.090504  0.039154 −0.086670  0.231734 −0.142187
−0.052983  0.009932  0.256898  0.061976  0.221203
0.378430 −0.566065 −0.053930  0.213747  0.270035
−0.011983  0.197319 −0.272956  0.192557  0.118456
0.061957 0.112657 −0.119115 0.264412 0.168405 0.176079
−0.158927 −0.215566  0.229795  0.155925  0.443989
−0.160895  0.249698  0.594345 −0.032610 −0.010338
−0.044051  0.033272  0.275889  0.251204 −0.105038
0.082821  0.114012 −0.204187 −0.079391  0.007779
0.457019  0.216939 −0.112717 −0.154964 −0.217469
−0.178780 −0.438827  0.120785 −0.039824  0.102616
−0.253781 0.051857 −0.071074 −0.008283 0.024601
General Manager −0.062453 0.102170 0.310711 0.284125
0.326782 −0.158714  0.016712  0.183801 −0.417426
−0.152734 −0.023646  0.164909 −0.110575 −0.072056
−0.612001  0.210495 −0.033328 −0.117623 −0.013938
0.396344  0.022361 −0.124084 −0.440229  0.255304
0.155034 0.023143 0.342917 0.329431 0.082336 0.413224
0.160484 −0.008136 −0.204239  0.195401 −0.115539
−0.564374 −0.115170 −0.360881 −0.241348  0.142061
−0.121093 −0.071374 −0.081903  0.305812 −0.130453
−0.196973 −0.372175  0.040870  0.160393 −0.367338
−0.082610  0.261792 −0.602926  0.395934  0.008966
0.148248  0.277762 −0.322895  0.024504  0.054545
−0.131161 −0.224245  0.180706  0.110252 −0.080069
0.233976 −0.138306 −0.384632 −0.011091  0.182932
−0.067817  0.161761 −0.053592 −0.298938 −0.046794
−0.204910  0.356065  0.036867 −0.204277  0.189515
0.012660 −0.098289  0.240858  0.071227 −0.150443
−0.462339  0.016768 −0.035814  0.032171 −0.034685
−0.245531 −0.003977  0.158986 −0.108275  0.296600
0.246917 0.057090 −0.366686 0.072892 0.096237
Computing-Tabulating-Recording  Company −0.006905
−0.320709  0.454474  0.272689  0.073386 −0.134352
0.130535 −0.290709  0.184584  0.248538  0.241625
0.068156 −0.279224  0.042626  0.137198  0.068104
−0.045686 −0.029830  0.164379 −0.229936  0.151545
0.315436 −0.144595 −0.037010 −0.061274  0.163766
−0.357870 −0.044173 −0.087049  0.043499 −0.035282
−0.071778 −0.128388 −0.178894 −0.110623  0.112915
−0.140242 −0.091270 −0.089845 −0.070970  0.100917
0.142294 −0.205974 −0.477081  0.059463  0.107142
−0.069762  0.067173  0.237853 −0.013568  0.272518
−0.074466  0.027096  0.075716 −0.432261 −0.135929
−0.246657 −0.060912  0.248881  0.288424 −0.085303
−0.146674  0.103487  0.003903 −0.017435  0.099766
−0.016230 −0.130144 −0.155146  0.179757  0.050131
0.533146 −0.101080 −0.096829  0.139852  0.275091
−0.098898 −0.142620 −0.419694 −0.136959 −0.602557
−0.188407  0.108796  0.089237 −0.237471  0.195888
0.176643  0.072892  0.165196 −0.261903  0.195344
0.167053 −0.054929  0.248035 −0.471862 −0.057125
−0.110788 −0.047236 −0.281023 0.216238

In some embodiments, the vector representations generated by neural network mod 375 in step S280 are used as new inputs to the artificial neural network for further training. In many cases, processing returns back to step S260 for further refinement and training of the artificial neural network (in those situations, the "initial" vector representations would not be generated randomly by word embedding mod 360, but rather would be the "new" vector representations generated by neural network mod 375 in step S280 of the previous iteration).

III. Further Comments and/or Embodiments

Some embodiments of the present invention recognize the following facts, potential problems and/or potential areas for improvement with respect to the current state of the art: (i) some systems use only unsupervised information to learn vector representations; (ii) some systems use only supervised information to learn vector representations; and/or (iii) existing systems do not apply semi-supervised approaches to learning embedding representations of text.

Some embodiments of the present invention may include one, or more, of the following features, characteristics and/or advantages: (i) learning vector representations of words and phrases, such that similar words/phrases have similar representations; (ii) learning word/phrase embeddings using both supervised and unsupervised information jointly; and/or (iii) building on a deep learning framework to learn vector representations of words/phrases using both supervised information (such as ontologies and manual annotations) and unsupervised information (for example, using language modeling) jointly.

Many embodiments of the present invention translate words and/or phrases into vector representations (that is, word embeddings). Diagram 400 (see FIG. 4) shows an example of a system (sometimes referred to as a "second embodiment system") according to one of these embodiments. In this embodiment, words/phrases 402 and/or documents 404 are input into embedding system 406, and, in turn, embedding system 406 converts words/phrases 402 and/or documents 404 into vectors 408. Embedding system 406 is adapted to generate similar vector representations for similar words/phrases/documents, in order to better compare the words/phrases/documents to each other in a natural language processing (NLP) system.

Figure 4:
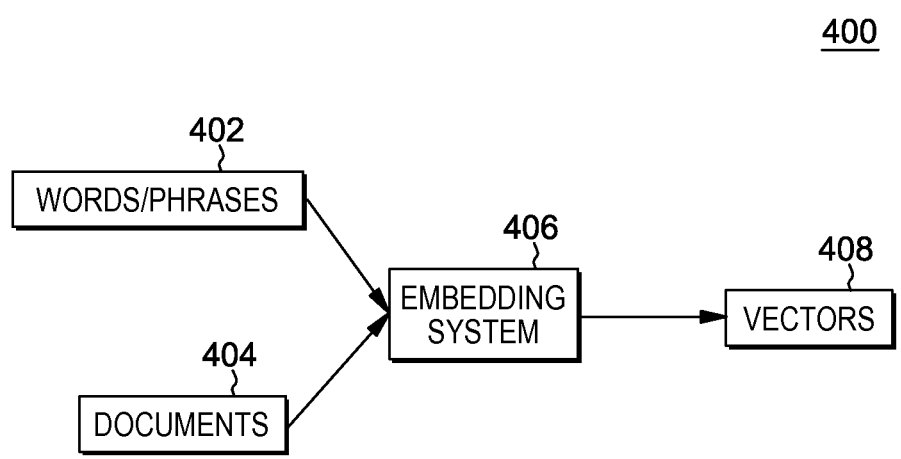
FIG. 4 is block diagram showing a second embodiment of a system according to the present invention.

Referring still to FIG. 4, in some situations, embedding system 406 generates vectors 408 for individual words. In other situations, embedding system 406 generates vectors 408 for phrases comprising sets of individual words. In still other situations, embedding system 406 generates vectors 408 for entire documents (depicted as documents 404) comprising sets of individual words in phrases. In some embodiments, the vector generated for a phrase is the sum of the vectors generated for each individual word included in the phrase. Similarly, in some embodiments, the vector generated for a document is the sum of the vectors generated for each word and/or phrase included in the document. However, this is not always the case, and embedding system 406 may generate vectors for words, phrases, and/or documents in many different ways, including, for example, using an artificial neural network adapted to learn vector representations.

Figure 5:
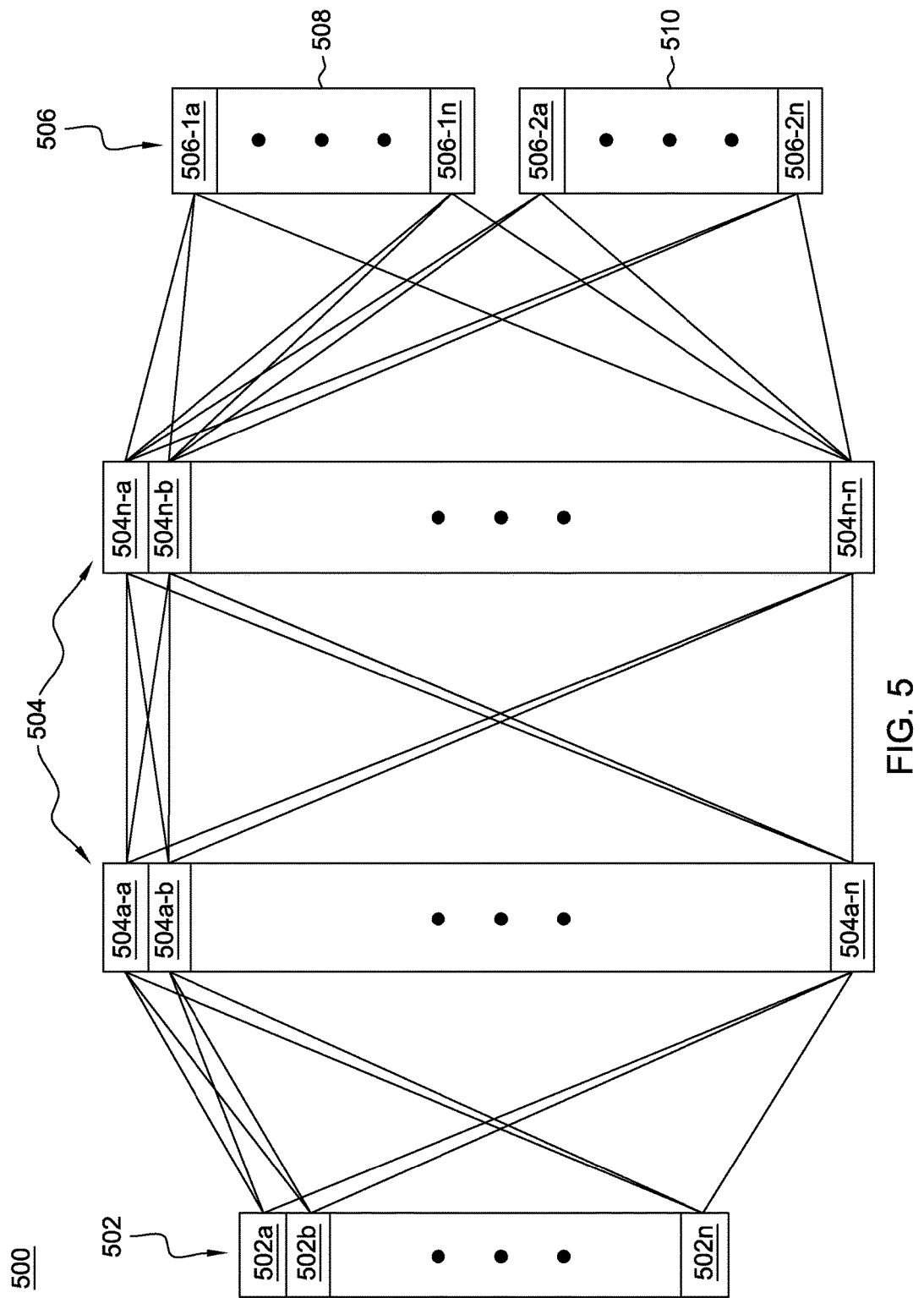
FIG. 5 is a neural network diagram depicting an artificial neural network according to the second embodiment system.

Certain embodiments according to the present invention include a semi-supervised framework to construct vector representations (embeddings) for words, phrases, and/or documents. In some embodiments, the framework includes: (i) an artificial neural network (see the Definitions subsection of this Detailed Description) involving an input layer, an output layer, and a number of hidden layers; (ii) a component to generate input features from input words, phrases, and/or documents; (iii) a component to generate pseudo labels for input; (iv) a component to generate actual labels for the input; and (v) a component to train the neural network Diagram 500 (see FIG. 5) is a neural network diagram depicting an artificial neural network according to the second embodiment system. As shown in FIG. 5, the neural network includes input layer 502, output layer 506, and hidden layers 504. In this embodiment, there may be between zero and "n" hidden layers, where "n" is a real number greater than or equal to one. Input layer 502, output layer 506, and each hidden layer 504 includes a plurality of nodes (or "neurons"), designed as 502a through 502n for input layer 502, 506-1a through 506-1n for pseudo labels portion 508 of output layer 506, 506-2a through 506-2n for actual labels portion 510 of output layer 506, 504a-a through 504a-n for the first hidden layer 504, and 504n-a through 504n-n for the last hidden layer 504. The laywise connections in the neural network may be all-connected (such that each neuron in one layer connects to each neuron in the immediately preceding layer and each neuron in the immediately subsequent layer, as depicted in FIG. 5) or partially-connected. Furthermore, in some embodiments, a neural network is a convolutional neural network and includes convolutional neural network-type layers. In many embodiments (including the embodiment depicted in FIG. 5), the output layer of the neural network includes two parts: one part corresponding to pseudo labels (pseudo labels portion 508) and one part corresponding to actual labels (actual labels portion 510).

Certain embodiments according to the present invention include a system that produces vector representations (or "features") for provided inputs (for example, words, phrases, and/or documents). In these embodiments, each input word or phrase is initially provided with an input vector which, in many cases, is randomly initialized. For longer inputs (such as documents), the input is divided into multiple parts, where each part includes its own vector representation, where the vector representation for the entire input is represented by the sum of the vector representations of each of the parts. Each part may correspond to a word, a phrase, a sentence, a fragment of a sentence, or any other group of characters that may be represented using a vector representation. In some embodiments, a sliding window approach is used, such that each part of an input document includes portions from the previous part and/or the subsequent part.

Certain embodiments according to the present invention generate pseudo labels (sometimes also referred to as "second metadata") for provided inputs. Generally speaking, a pseudo label is a vector representation output that is produced from a vector representation input using one or more unsupervised learning methods (for a definition of "unsupervised learning method", see the Definitions sub-section of this Detailed Description).

In some embodiments, a method based on reconstruction error is used to generate pseudo labels for input features (that is, vector representations), when the input features correspond to input words and/or phrases. Specifically, in these embodiments, when a vector representation is based on a word and/or phrase, the generated pseudo label is simply the word and/or phrase that the vector representation is based on. For example, in these embodiments, the pseudo label for the vector representation of the word "computing" is "computing".

In some embodiments, a method based on language modeling is used to generate pseudo labels for input features (that is, vector representations), when the input features correspond to input words, phrases, and/or documents. In these embodiments, a target word is used as the pseudo label for each input word, phrase, and/or document, where the target word can be, for example: (i) the next word in the phrase, sentence, or document; (ii) the previous word in the phrase, sentence, or document; (iii) a contextual word pertaining to the input word; and/or (iv) a word in the same sentence (or sentence fragment) as the input word. As with input features, a pseudo label generated for an input document may be the sum of smaller parts that make up the input document.

Certain embodiments according to the present invention generate actual labels (also referred to as "first metadata" for provided inputs). Generally speaking, an actual label is a vector representation output that is produced from a vector representation input using one or more supervised learning methods (for a definition of "supervised learning method", see the Definitions sub-section of this Detailed Description).

In some embodiments, a distant supervision-based method is used to generate actual labels for input features. In these embodiments, existing ontologies may be used to generate the actual labels (such as, for example, word types and/or synonyms. Some examples of ontologies that may be used include, but are not limited to: (i) UMLS (the Unified Medical Language System); (ii) YAGO (Yet Another Great Ontology); and/or (iii) WordNet (note: the term(s) "UMLS" and/or "WordNet" may be subject to trademark rights in various jurisdictions throughout the world and are used here only in reference to the products or services properly denominated by the marks to the extent that such trademark rights may exist).

In some embodiments, a fully supervised method is used to generate actual labels for input features. In these embodiments, actual labels are generated using one or more natural language processing (NLP) annotators known (or yet to be known) in the art.

Certain embodiments according to the present invention train a neural network (such as the neural network depicted in FIG. 5) based, at least in part, on the generated pseudo labels (see pseudo labels portion 508) and/or actual labels (see actual labels portion 510). In many embodiments, conventional approaches (for example, stochastic gradient descent) for training neural networks are used. In many embodiments, word/phrase vectors and network parameters are further optimized during training.

In some embodiments, when an actual label is not available for a given input vector, only a pseudo label is used for training. In some embodiments, pseudo labels and actual labels are given weights, to further optimize the neural network.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Natural Language: any language used by human beings to communicate with each other.

Natural Language Processing: any derivation of meaning from natural language performed by a computer.

Metadata: any data pertaining to other data, including, but not limited to, data describing other data and/or data providing structural information pertaining to other data.

Supervised Learning Method: any method for obtaining metadata for natural language text using known information about the natural language text, including, but not limited to: methods using one or more ontologies, methods using natural language processing annotator(s), discriminative training methods (such as empirical risk minimization and/or structural risk minimization), and/or generative training methods.

Unsupervised Learning Method: any method for obtaining metadata for natural language text that does not use known information pertaining to the natural language text, including, but not limited to: language modeling methods, data mining methods, clustering methods, hidden Markov models, blind signal separation using feature extraction techniques, self-organizing maps, adaptive resonance theory, and/or reinforcement learning methods.

Artificial Neural Network: any module that uses interconnected nodes (or "neurons") to compute output values from input values; artificial neural networks generally (but not always) include adaptive weights, are capable of approximating non-linear functions of their inputs, and are capable of being trained (or capable of "learning") using methods such as backpropagation, an expectation-maximization algorithm, and/or evolutionary algorithms.

What is claimed is:

1. A computer program product comprising a computer readable storage medium having stored thereon:
    program instructions programmed to receive a set of natural language text;
    program instructions programmed to generate a set of first metadata for the set of natural language text, where the first metadata is generated using supervised learning method(s);
    program instructions programmed to generate a set of second metadata for the set of natural language text, where the second metadata is generated using unsupervised learning method(s);
    program instructions programmed to train an artificial neural network adapted to generate vector representations for natural language text, where the training is based, at least in part, on the received natural language text, the generated set of first metadata, and the generated set of second metadata;
    program instructions programmed to generate a set of at least two vector representations for the set of natural language text using the trained artificial neural network, where each vector representation of the set of at least two vector representations pertains to a respective subset of natural language text from the set of natural language text;
    program instructions programmed to generate a vector representation pertaining to the set of natural language text by adding each of the vector representations in the generated set of at least two vector representations; and
    program instructions programmed to store the generated vector representation pertaining to the set of natural language text for use by a natural language processing system.

2. The computer program product of claim 1, further comprising:
    program instructions programmed to determine an amount of similarity between at least two subsets of natural language text from the set of natural text by comparing their respectively generated vector representations.

3. The computer program product of claim 2, wherein each of the at least two subsets of natural language text is a word.

4. The computer program product of claim 1, further comprising:
    program instructions programmed to generate a set of first metadata for the generated set of at least two vector representations, where the first metadata for the generated set of at least two vector representations is generated using supervised learning method(s);

program instructions programmed to generate a set of second metadata for the set of at least two vector representations, where the second metadata for the generated set of at least two vector representations is generated using unsupervised learning method(s); and program instructions programmed to train the artificial neural network based, at least in part, on the generated set of at least two vector representations, the generated set of first metadata for the set of at least two vector representations, and the generated set of second metadata for the set of at least two vector representations.

5. The computer program product of claim 1, further comprising:

program instructions programmed to generate a set of initial vector representations for the set of natural language text;

program instructions programmed to generate a set of first metadata vector representations for the generated set of first metadata; and program instructions programmed to generate a set of second metadata vector representations for the generated set of second metadata;

wherein the training of the artificial neural network is further based, at least in part, on the generated set of initial vector representations, the generated set of first metadata vector representations, and the generated set of second metadata vector representations.

6. The computer program product of claim 1, wherein the supervised learning methods utilize at least one of a natural language processing annotator or an ontology.

7. The computer program product of claim 1, wherein the unsupervised learning methods are based on at least one of reconstruction error or language modeling.

8. A computer system comprising:
a processor(s) set; and
a computer readable storage medium;
wherein:
the processor set is structured, located, connected and/or programmed to run program instructions stored on the computer readable storage medium; and
the program instructions include:
program instructions programmed to receive a set of natural language text;
program instructions programmed to generate a set of first metadata for the set of natural language text, where the first metadata is generated using supervised learning method(s);
program instructions programmed to generate a set of second metadata for the set of natural language text, where the second metadata is generated using unsupervised learning method(s);
program instructions programmed to train an artificial neural network adapted to generate vector representations for natural language text, where the training is based, at least in part, on the received natural language text, the generated set of first metadata, and the generated set of second metadata;
program instructions programmed to generate a set of at least two vector representations for the set of natural language text using the trained artificial neural network, where each vector representation of the set of at least two vector representations pertains to a respective subset of natural language text from the set of natural language text;

program instructions programmed to generate a vector representation pertaining to the set of natural language text by adding each of the vector representations in the generated set of at least two vector representations; and program instructions programmed to store the generated vector representation pertaining to the set of natural language text for use by a natural language processing system.

9. The computer system of claim 8, further comprising:
program instructions programmed to determine an amount of similarity between at least two subsets of natural language text from the set of natural text by comparing their respectively generated vector representations.

10. The computer system of claim 9, wherein each of the at least two subsets of natural language text is a word.

11. The computer system of claim 8, further comprising:
program instructions programmed to generate a set of first metadata for the generated set of at least two vector representations, where the first metadata for the generated set of at least two vector representations is generated using supervised learning method(s);

program instructions programmed to generate a set of second metadata for the set of at least two vector representations, where the second metadata for the generated set of at least two vector representations is generated using unsupervised learning method(s); and program instructions programmed to train the artificial neural network based, at least in part, on the generated set of at least two vector representations, the generated set of first metadata for the set of at least two vector representations, and the generated set of second metadata for the set of at least two vector representations.

12. The computer system of claim 8, further comprising:
program instructions programmed to generate a set of initial vector representations for the set of natural language text;

program instructions programmed to generate a set of first metadata vector representations for the generated set of first metadata; and program instructions programmed to generate a set of second metadata vector representations for the generated set of second metadata;

wherein the training of the artificial neural network is further based, at least in part, on the generated set of initial vector representations, the generated set of first metadata vector representations, and the generated set of second metadata vector representations.

13. The computer system of claim 8, wherein the supervised learning methods utilize at least one of a natural language processing annotator or an ontology.

14. The computer system of claim 8, wherein the unsupervised learning methods are based on at least one of reconstruction error or language modeling.

* * * * *